(12) United States Patent
Nakajima

(10) Patent No.: US 6,650,437 B1
(45) Date of Patent: Nov. 18, 2003

(54) IMAGE PROCESSING SYSTEM AND IMAGE PROCESSING METHOD

(75) Inventor: Nobuyoshi Nakajima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/390,636

(22) Filed: Sep. 7, 1999

(30) Foreign Application Priority Data

Sep. 7, 1998 (JP) .......................................... 10-252706

(51) Int. Cl.[7] .......................... G06K 15/00; H04N 1/40; H04N 1/60; H04N 5/225
(52) U.S. Cl. ..................... 358/1.9; 358/3.23; 358/3.27; 358/523; 358/532; 348/207.1; 348/207.2; 348/231.3
(58) Field of Search ................................ 358/1.9, 3.24, 358/3.23, 3.26, 3.27, 504, 523, 527, 406, 532; 348/207.1, 207.2, 222.1, 231.99, 231.3, 254

(56) References Cited

U.S. PATENT DOCUMENTS

| | | | | |
|---|---|---|---|---|
| 5,717,839 A | * | 2/1998 | Ichikawa | ..................... 358/1.9 |
| 6,011,547 A | * | 1/2000 | Shiota et al. | ................ 382/254 |
| 6,466,334 B1 | * | 10/2002 | Komiya et al. | ............... 358/1.9 |
| 6,552,743 B1 | * | 4/2003 | Rissman | ................... 348/207.2 |
| 2002/0030833 A1 | * | 3/2002 | Kuwata et al. | ............... 358/1.9 |
| 2002/0122194 A1 | * | 9/2002 | Kuwata et al. | ............... 358/1.9 |
| 2002/0167592 A1 | * | 11/2002 | Toyoda et al. | ............ 348/207.1 |

FOREIGN PATENT DOCUMENTS

JP          2660170          6/1997

* cited by examiner

Primary Examiner—Scott Rogers
(74) Attorney, Agent, or Firm—Birch, Stewart, Kolasch & Birch, LLP

(57) ABSTRACT

When image data to be transferred to a CD-R writer is inputted from a scanner to an image data exchanger, property information (information expressing attributes of the image data, information expressing the input source/output location of the image data, or the like) is added to the image data, and then the image data is stored in a spool. When the image data is fetched from the spool, on the basis of the property information, image processing corresponding to attributes of the image data and to an output location (the CD-R writer) is carried out, and then the image data is transferred to the CD-R writer.

17 Claims, 8 Drawing Sheets

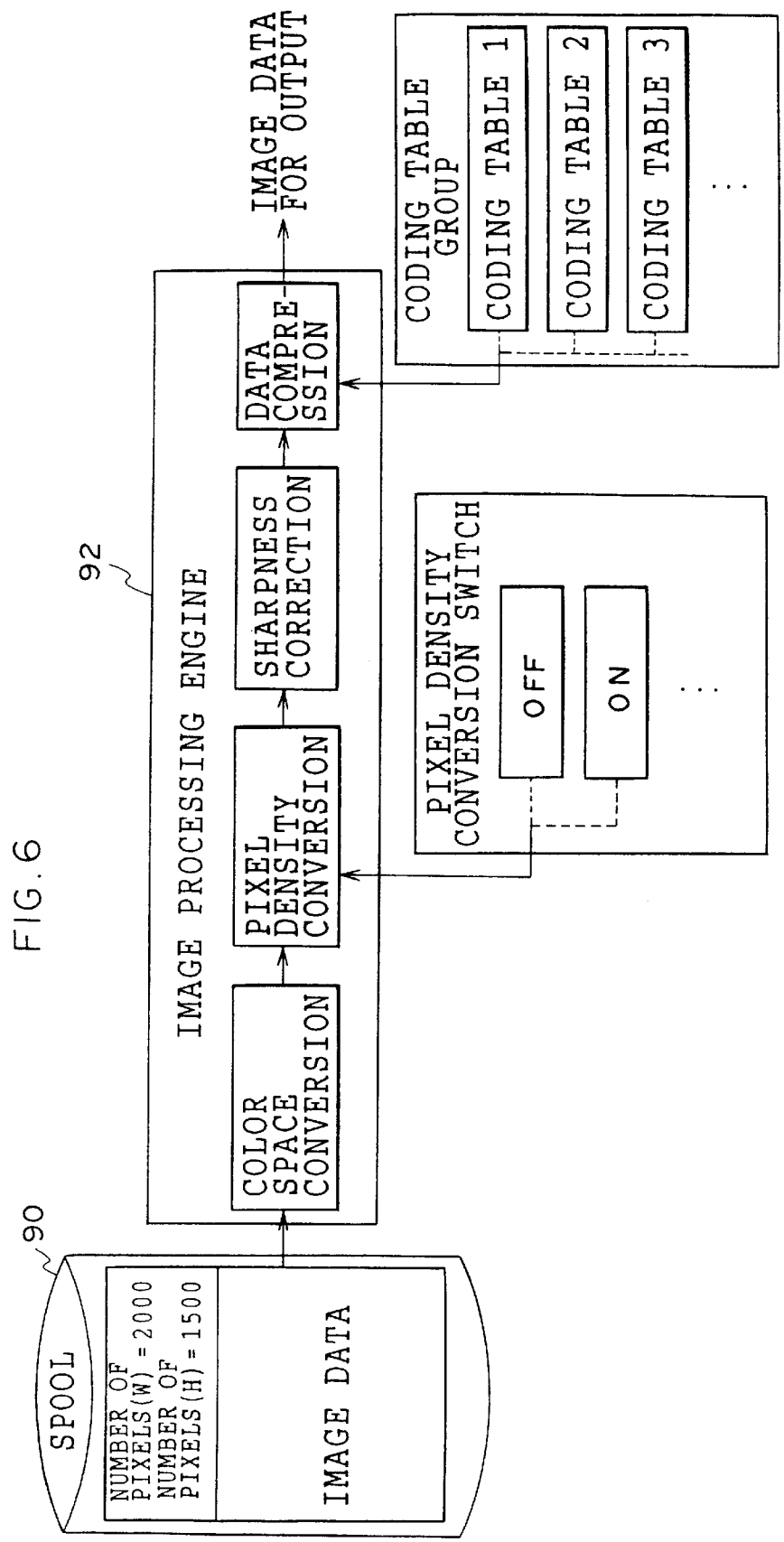

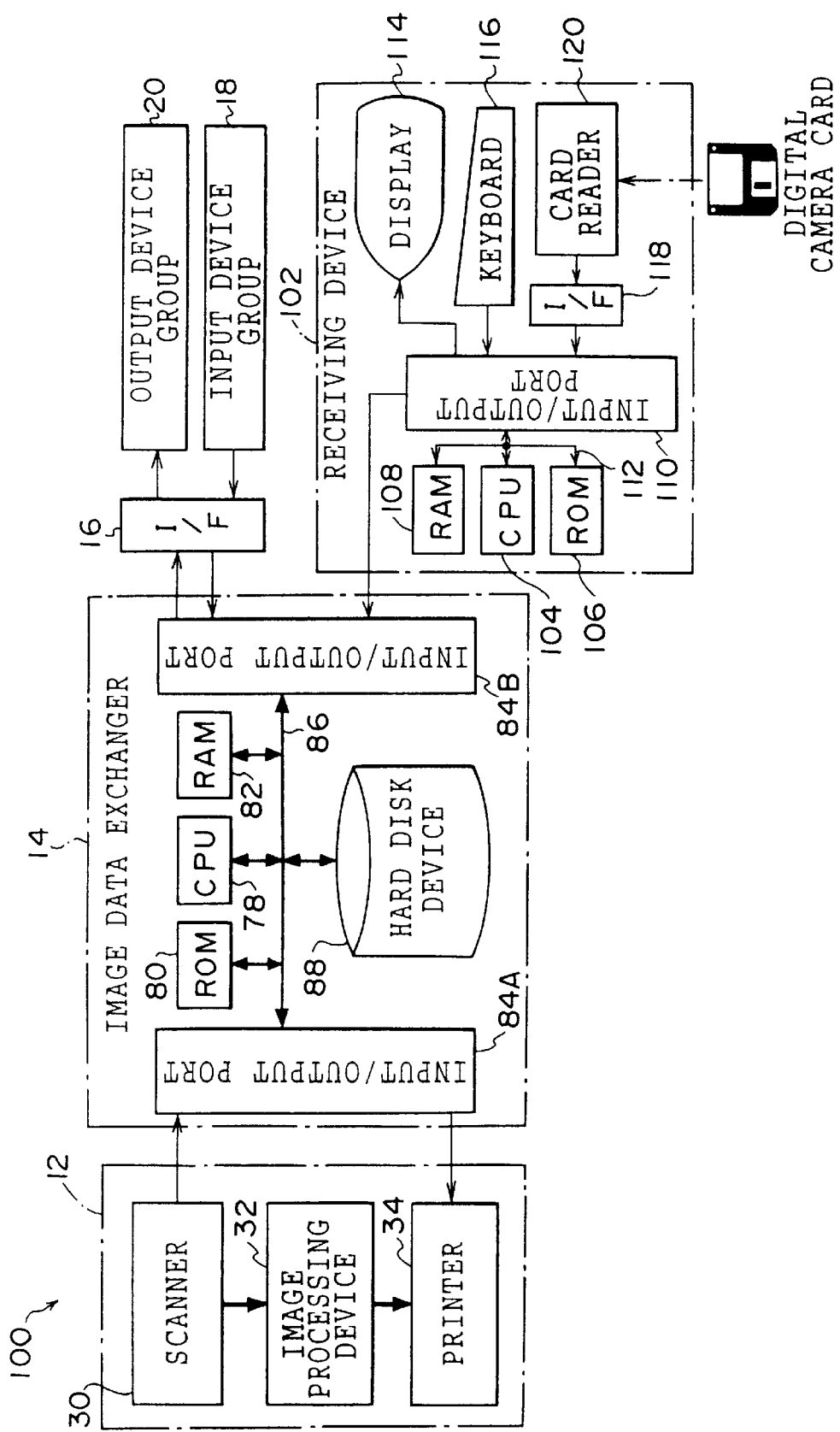

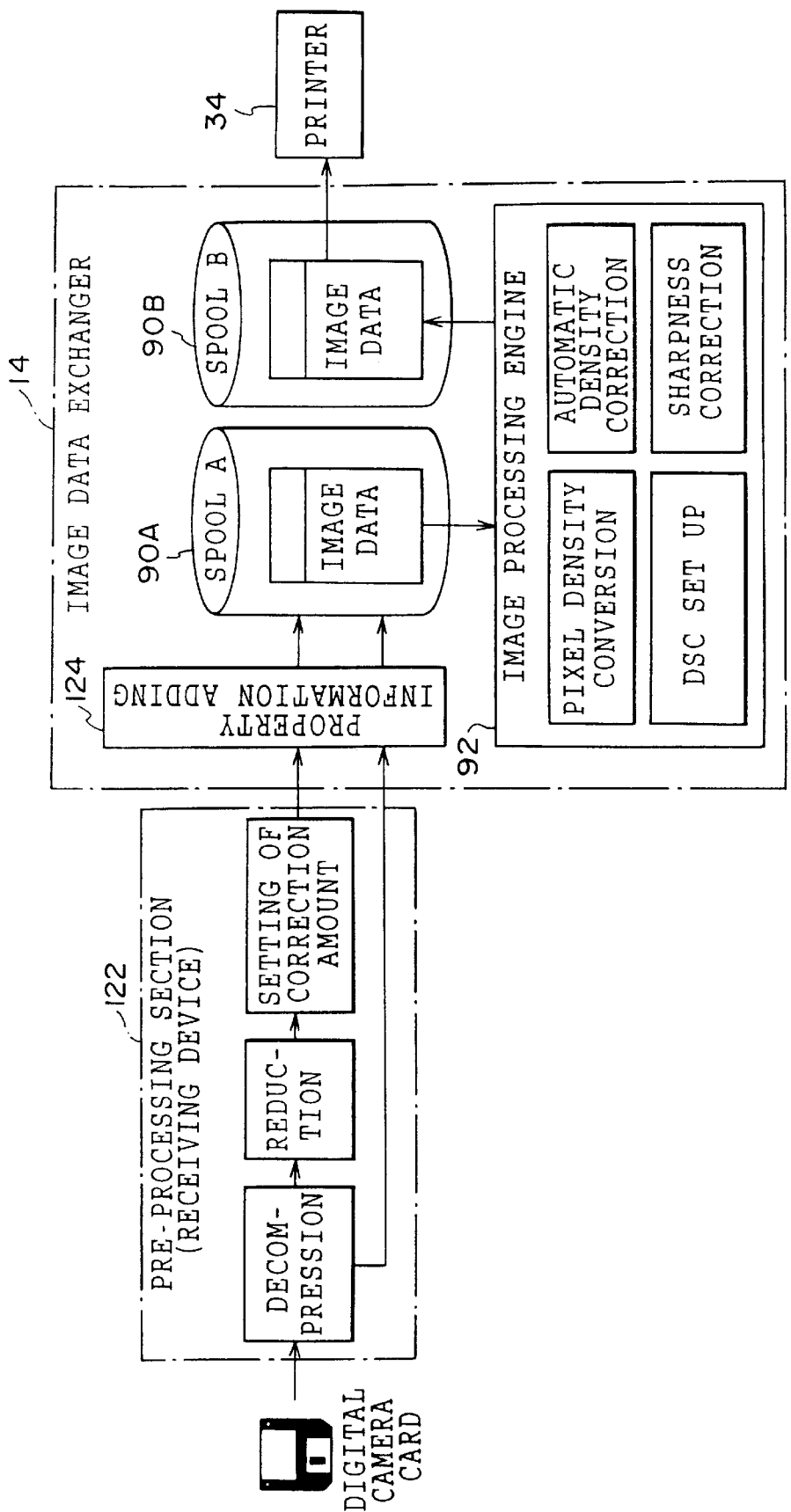

IMAGE PROCESSING SYSTEM AND IMAGE PROCESSING METHOD

BACKGROUND OF THE INVENTION

1. Field of the Invention

The present invention relates to an image processing system and an image processing method, and in particular, to an image processing method which carries out image processing on image data inputted from an input device, and transfers the image processed data to an output device, and to an image processing system to which the image processing method can be applied.

2. Description of the Related Art

Conventional image processing systems have been known which are structured by an image input device, an image processing device, and an image output device which are connected in that order. The image input device (scanner) reads an image recorded on an image recording material such as a photographic film, and inputs the image data obtained by reading. The image processing device carries out image processing such as various types of correction and conversion and the like on the image data inputted from the image input device. On the basis of the image data which has been subjected to image processing at the image processing device, the image output device (printer) records an image onto an image recording material such as a photographic printing paper. In this type of image processing system, as compared with a conventional photographic processing system in which a film image recorded on a photographic film is recorded by surface exposure onto a photographic printing paper, the image quality of the output image can be freely controlled by the image processing of the image data, and the image processing at the image processing device can be optimized in accordance with the characteristics of the image input device and the characteristics of the image output device. (For example, in a case in which the color balance of the image expressed by the image data inputted from the image input device is skewed toward a specific color, an image processing for correcting this skewing of the color balance is carried out. As another example, in a case in which the sharpness in a specific direction of the image expressed by the inputted image data is low, an image processing for improving the sharpness in the specific direction is carried out.) Thus, a high-quality output image can be obtained.

However, in the above-described image processing system, if attempts are made to use an image input device or an image output device which are of different types than those that were envisaged for use when the image processing system was designed, the image processing at the image processing device does not consider characteristics of image input devices and image output devices of different types than those envisaged at the time of design. Thus, drawbacks occur such as the image quality of the output image greatly deteriorates. It is difficult to replace the image input device or the image output device of the image processing system with an image input device or an image output device having different characteristics, or to change the structure of the image processing system by additionally connecting an image input device or an image output device having different characteristics. Thus, there is the drawback that the expandability of the system is poor.

Japanese Patent No. 2660170 discloses an image processing system in which plural input devices and plural output devices are connected to a single image processing device. In this system, the image data input from the respective input devices are converted by the image processing device into respective image data of an intermediate image space called a hub. Thereafter, the image data of the intermediate image space are converted (subjected to image processing) in accordance with the type of output device which is being used, and are outputted. However, in this structure, the image processing device always has to carry out conversion twice on the image data inputted from the input devices. Thus, the load on the image processing device is great, and the processing capability of the image processing system is low. Further, when the image data is converted twice, due to effects such the quantization errors being accumulated, the deterioration in image quality become great enough to be detected by the naked eye.

SUMMARY OF THE INVENTION

In view of the aforementioned, an object of the present invention is to provide an image processing system in which high-speed processing and high quality of output images can be realized.

In order to achieve the above object, an image processing system relating to a first aspect of the present invention includes at least one input device which inputs image data and at least one output device which, on the basis of transferred image data for output, carries out image output processing, and the image processing system comprises: storing means for temporarily storing image data; adding means for adding, to image data inputted from an input device, supplementary information including information relating to attributes of the image data; setting means for setting an output device which is to carry out image output processing on the image data; image processing means for carrying out image processing, which corresponds to the attributes of the image data and to the output device which is to carry out image output processing, on at least one of image data temporarily stored in the storing means and image data which is read from the storing means after the supplementary information has been added thereto and the image data has been temporarily stored in the storing means; and transfer means for transferring to the output device, as image data for output, the image data which, after having been temporarily stored in the storing means, was read and for which image processing by the image processing means has been completed.

The image processing system relating to the first aspect of the present invention includes at least one input device and at least one output device. The input device may be, for example, a scanner which reads images recorded on a photographic photosensitive material or some other image recording material and inputs the image data obtained by reading; a data reading device which reads and inputs image data stored on an information storage medium (a magnetic disk, an optical disk, a magneto-optical disk, a memory card, an IC card, or the like); a communications control device which receives and inputs image data which has been sent from another information processing equipment connected thereto by a communications line; or the like. The output device may be, for example, a printer which, as the image output processing, records an image onto an image recording material such as a photographic printing paper; a data writing device which, as the image output processing, writes image data onto an information storage medium; an image display device which, as the image output processing, displays an image on a display means such as a display; and a communications control device which, as the image output processing, sends image data to another information processing equipment connected thereto by a communications line.

The invention of the first aspect is provided with an adding means which adds, to the image data inputted from the input device, supplementary information including information relating to the attributes of the image data (i.e., the characteristics or properties of the image data). The information relating to the attributes of the image data may be information expressing the attributes of the image data (e.g., at least one of the color space of the image data, the resolution, the number of bits (the number of bits per pixel or the like), the number of channels, and the like). Or, because the attributes of the image data vary in accordance with the input device, the information relating to the attributes of the image data may be information expressing the type of the input device or the characteristics of the input device. Further, if the type of image processing to be carried out differs in accordance with the attributes of the image data, the information relating to the attributes of the image data may be information expressing the type of image processing to be carried out on the image data. Further, if the contents of the image processing to be carried out differ in accordance with the attributes of the image data, the information relating to the attributes of the image data may be information expressing the contents of the image processing to be carried out on the image data.

The image processing means carries out image processings, which correspond to the attributes of the image data or to the output device to carry out the image output processing (the output device set by the setting means) on at least one of image data which is temporarily stored in the storing means and image data which, after having had supplementary information added thereto and having been temporarily stored in the storing means, is read from the storing means. If the image processing, which is carried out by the image processing means and corresponds to the attributes of the image data and to the output device which is to carry out image output processing, is carried out after the supplementary information is added to the image data, the image processing can be carried out on the basis of the supplementary information added to the image data, as in the second aspect of the present invention. Further, if the image processing means carries out image processing before the supplementary information is added to the image data, the attributes of the image data may be recognized on the basis of information relating to the attributes of the image data, e.g., on the basis of the type of the input device which is the image data input source, and the image processing may be carried out on the basis of the recognized attributes. Or, in a case in which information relating to the attributes of the image data is transferred from the input device, image processing may be carried out on the basis of the transferred information.

The transfer means transfers to the output device, as image data for output, the image data which, after having been temporarily stored in the storing means, was read and for which image processing by the image processing means has been completed. In this way, the image output processing is carried out at the output device on the basis of the transferred image data for output.

In this way, in the first aspect of the present invention, image data for output can be obtained by carrying out image processing, which corresponds to the attributes of the image data and to the output device which is to carry out image output processing, without the inputted image data being converted to image data of an intermediate image space (i.e., image data for output can be obtained by a single image conversion). Thus, the load on the image processing means is not excessive, and the processing speed can be made fast (the processing amount per unit time can be increased), and the image quality of the output image is high.

The image processing carried out by the image processing means is image processing which corresponds to the attributes of the image data and to the output device which is to carry out the image output processing. Thus, even if the image processing system of the present invention includes plural input devices, the image data inputted from the respective input devices can be subjected to optimal image processing in accordance with the attributes of the respective image data which vary in accordance with the characteristics of the respective input devices, on the basis of the added supplementary information, or on the basis of the type of the input device which is the input source of the image data, or on the basis of transferred information in the case in which information relating to the attributes of the image data is transferred from the input device, or the like. Further, even if the image processing system of the present invention includes plural output devices, optimal image processings corresponding to the characteristics of the respective output devices can be carried out on the image data used in the image output processings at the respectively different output devices. In this way, even if the image processing system relating to the present invention is structured so as to include arbitrary input devices and arbitrary output devices, the system has high expandability without there being a deterioration in the image quality of the output image.

Further, in accordance with the present invention, the attributes of the respective image data can be determined by referring to the supplementary information added to the respective image data. Therefore, even if the image processing system of the present invention includes plural input devices, by referring to the supplementary information, the image data inputted from the respective input devices can be easily differentiated from one another, and data management can be carried out easily.

In the present invention, the image processing which is to be carried out on the image data (the image processing corresponding to the attributes of the image data and to the output device which is to carry out the image output processing) may be a single type of image processing, but usually, the image processing to be carried out is plural types of image processings. In this case, in consideration of dispersing the load to be applied to the image processing means, for example, a structure can be used in which the image processing means carries out plural image processings non-simultaneously, or a structure can be used in which plural image processing means are provided and the plural image processings are divided up amongst and carried out by the plural image processing means, or a structure can be used in which the output device is provided with an image processing means for carrying out some of the image processings among the plural image processings. In this way, if there are plural image processings to be carried out on the image data and the image processing means carries out the plural image processings non-simultaneously (i.e., staggered over time), or if the plural image processings are divided amongst and carried out by plural image processing means, there is the need to manage the execution of the respective image processings such that the respective image processings to be carried out are all carried out by at least before the image output processing is carried out.

Therefore, in a case such as that described above, it is preferable that, in a case in which the image processing means carries out a predetermined image processing on the image data, the adding means adds, to the supplementary information of the image data, information expressing that the predetermined image processing has been carried out by the image processing means, as in the third aspect. In this way, by referring to the supplementary information, it can be recognized which of the image processings, among the plural image processings to be carried out on the image data, have been carried out. Namely, in a case in which it is determined on the basis of the supplementary information (which expresses that image processing(s) has/have been carried out) that there are plural image processings which are yet to be carried out, the plural image processings may be carried out divided amongst plural image processing means, or the image processing means may carry out plural image processings non-simultaneously. In this way, the execution of the image processing can be easily managed.

In the present invention, the image processing means may carry out image processing on the image data at a time before the image data to which the supplementary information has been added is temporarily stored the storing means, or at a time after the image data to which the supplementary information has been added has been read from the storing means after having been temporarily stored in the storing means. If there are plural image processings to be carried out, the plural image processings may be divided up such that some image processings are carried out at one of the above times whereas others are carried out at the other time. Further, for image data which is inputted from a first input device which is to operate at a high speed and a high operation rate, as in the fourth aspect, it is preferable that after the supplementary information has been added to the image data and the image data has been temporarily stored in the storing means, the image data is read from the storing means and image processing is carried out.

In the sequence of the transfer of data including the image data, the data transfer source usually holds the transfer data and is in a state of standby from the time the data transfer source transfers the data until the time the data transfer source is notified from the data transfer location of receipt of the data. In the fourth aspect of the present invention, until the image data, which is inputted from a first input device which is to operate at a high speed and a high rate of operation, has supplementary information added thereto and is temporarily stored in the storing means, image processing which generally requires time is not carried out. The image processing is carried out after the image data has been read from the storing means. Thus, the receipt of the image data inputted from the input device (the data transfer source) (i.e., the temporary storing of the image data in the input means) can be completed in a short time. Accordingly, image data can be received from the input device without leading to a decrease in the processing speed or the rate of operation of the input device.

In a case in which there are plural image processings to be carried out, instead of carrying out image processing only after the image data has been read from the storing means, among the plural image processings which are to be carried out, those image processings which are completed in a relatively short time or those image processings which result in a small load on the image processing means may be carried out before the temporary storing of the image data in the storing means, and the other image processings may be carried out after the image data has been read from the storing means. In this case, when the image data is received from the input device, the decrease in the processing speed and the operation rate of the input device can be kept to a minimum.

For image data, for which a first output device which is to operate at a high speed or a high operation rate is set as the output device for carrying out image output processing, it is preferable that the image processing means carries out image processing before the image data is temporarily stored in the storing means, as in the fifth aspect. In this way, image data, for which a first output device (which is to operate at high speed and a high rate of operation) is set as the output device for carrying out image output processing, is stored in the storing means in a state in which the image processings thereon have been completed. Thus, the processing time of the image processing is not added to the time required to transfer the image data to the output device. Accordingly, image data can be transferred to the output device without leading to a decrease in the processing speed or the rate of operation of the output device.

In a case in which there are plural image processings to be carried out, instead of the image processings being carried out only before the image data is temporarily stored in the storing means, among the plural image processings which are to be carried out, those image processings which are completed in a relatively short time or those image processings which result in a small load on the image processing means may be carried out after the image data is read from the storing means, and the other image processings may be carried out before the image data is temporarily stored in the storing means. In this case, when the image data is transferred to the output device, the decrease in the processing speed and the operation rate of the output device can be kept to a minimum.

There are existing image processing systems structured such that the following devices are connected in order: a scanner which reads an image which is recorded on an image recording material such as a photographic film and inputs the image data; an image processing device which carries out various types of image processings on the image data inputted from the scanner; and a printer which, on the basis of the image data on which image processing has been carried out at the image processing device, records images onto an image recording material such as a photographic printing paper. In such an image processing system, when it is desired to use the image data inputted from the scanner in an image output processing at an output device other than the printer, or when there is a request to, for example, record an image onto an image recording material by the printer by using image data inputted from an input device other than the scanner, such requests can be satisfied by using the above-described existing image processing system as a base, and adding thereto the storing means, adding means, image processing means, and transfer means of the present invention, and by connecting input devices other than the scanner and output devices other than the printer, so as to form the image processing system of the present invention.

In the above-described aspects, it is anticipated that high-speed processing of a large amount of image (a large amount of image data) will be demanded of the route of the existing image processing system (i.e., the "scanner→image processing device→printer" route) as compared with routes including other input devices and other output devices. Therefore, when the image processing system relating to the present invention is formed by using as the base thereof an existing image processing system such as that described above, if the scanner is the "first input device which is to operate at high speed and a high operation rate" of the fourth aspect and the printer is the "first output device which is to operate at a high speed or a high operation rate" of the fifth aspect, the above-described requests can be satisfied without leading to a great decrease in the processing speed and the operation rate of the scanner and the printer, i.e., without leading to a great decrease in the processing capability of the existing image processing system.

If the fourth and fifth aspects of the present invention are applied to all of the input devices and all of the output devices forming the image processing system relating to the present invention, all of the input devices and all of the output devices can be operated at high speed and a high operation rate. However, if this is the case, there is the possibility that the structure will become complex, such as there will be the need to provide a storing means having a very large storage capacity, or the like.

Thus, in the sixth aspect of the present invention, in the first aspect, for image data which is inputted from a second input device of which high-speed or high-operation-rate operation is not required, the image data is subjected to image processing before being temporarily stored in the storing means. In this way, although it takes time for the image data inputted from the second input device to be received and there is the possibility that the processing speed or the operation rate of the second input device will decrease, there is no need for a storage region for temporarily storing, before image processing, the image data inputted from the second input device. Thus, the structure of the image processing system can be prevented from becoming complex.

When image processing is carried out on the image data inputted from the second input device before the image data is temporarily stored in the storing means, it is ascertained which of the input devices the image data input source device (the second input device) is, and the determination of the attributes of the image data is easy. Thus, image processing may be carried out before the adding means adds the supplementary information to the image data, or may be carried out after the adding means adds the supplementary information to the image data.

In the seventh aspect of the present invention, in the first aspect, for image data for which a second output device, of which high-speed or high-operation-rate processing is not required, is set as an output device for carrying out image output processing, after the image data has supplementary information added thereto and is temporarily stored in the storing means, the image processing means reads the image data from the storing means, and carries out image processing, and has the image data transferred by the transfer means. In this way, in the same way as in the sixth aspect, although it takes time to transfer the image data to the second output device and there is the possibility that the processing speed or the operation rate of the second output device will decrease, there is no need for a storage region for temporarily storing, after image processing, the image data to be transferred to the second output device. Thus, the structure of the image processing system can be prevented from becoming complex.

A second invention is an image processing method for an image processing system including at least one input device which inputs image data and at least one output device which, on the basis of transferred image data for output, carries out image output processing, the image processing method comprising the steps of: adding, to image data inputted from an input device, supplementary information including information relating to attributes of the image data; carrying out image processing, which corresponds to the attributes of the image data or to an output device which is set as an output device which is to carry out image output processing, on at least one of image data, which is temporarily stored in a storing means for temporarily storing image data, and image data, which, after having had supplementary information added thereto and having been temporarily stored in the storing means, is read from the storing means; and transferring to the output device, as image data for output, image data which, after having been temporarily stored in the storing means, has been read and for which image processing has been completed. In the same way as in the first aspect, the processing speed of the image processing system can be made fast and the image quality of the output image is high.

BRIEF DESCRIPTION OF THE DRAWINGS

FIG. 6 is a schematic view for explaining an example of image processing at the image processing engine in a case in which image data inputted from the scanner is transferred to the CD-R writer.

FIG. 7 is a block diagram illustrating a schematic structure of an image processing system relating to a second embodiment of the present invention.

FIG. 8 is a schematic view for explaining an example of image processing in a case in which image data, which has been stored on a memory card/IC card by photographing by a digital camera, is transferred to a printer.

DESCRIPTION OF THE PREFERRED EMBODIMENTS

As one example of the embodiments of the present invention, a first embodiment of the present invention will be described in detail hereinafter with reference to the drawings.

First Embodiment

Figure 1:
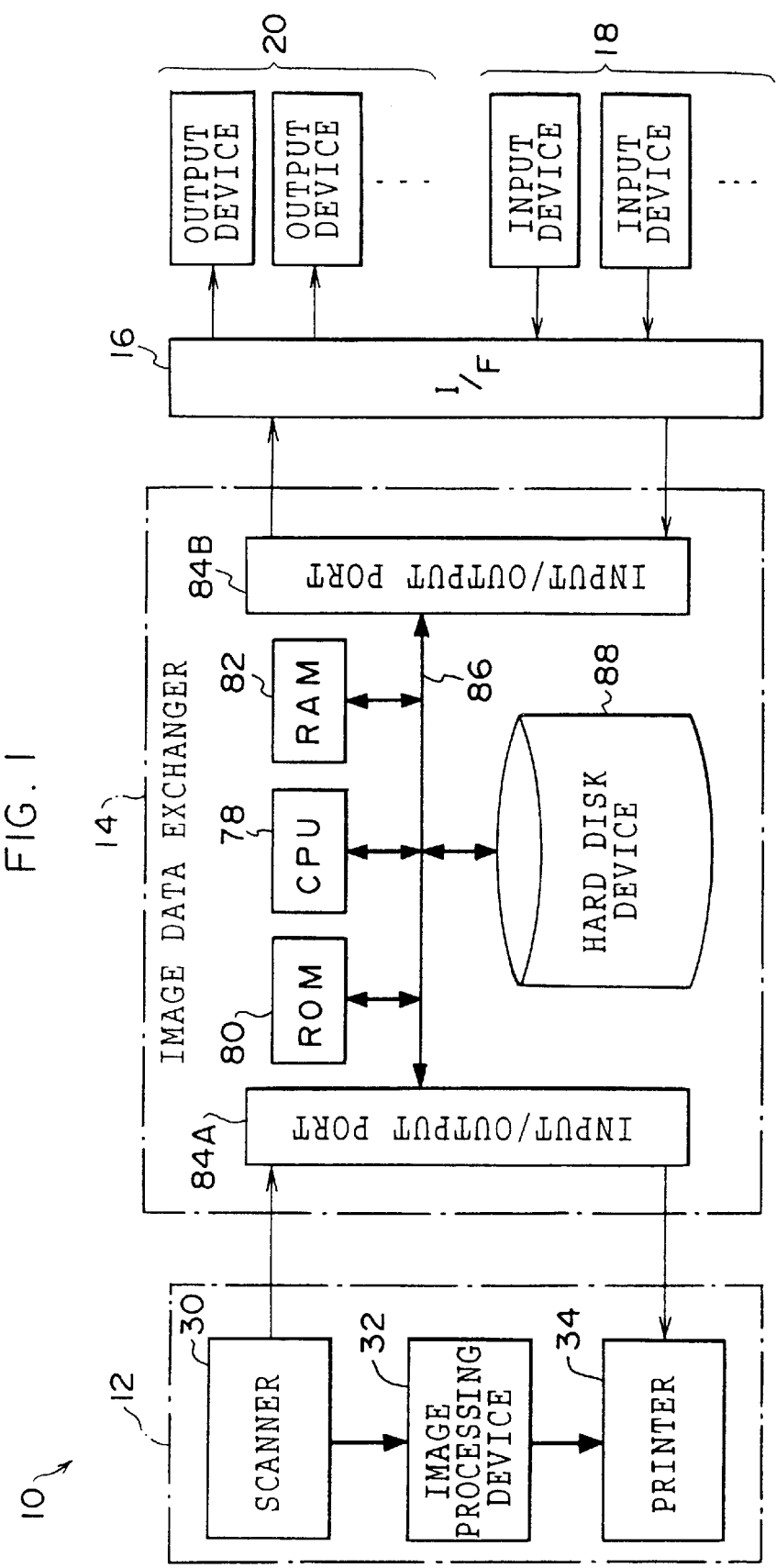
FIG. 1 is a block diagram illustrating a schematic structure of an image processing system relating to a first embodiment of the present invention.

FIG. 1 illustrates an image processing system 10 relating to the present first preferred embodiment. At the image processing system 10, an input device group 18 and an output device group 20 are connected to a digital lab system (a previously-existing image processing system) 12 via an image data exchanger 14 and an interface (I/F) circuit 16. The digital lab system 12 is capable of high-speed processing in which a film image (a negative image or a positive image which, after the photographing of an object, is made visible due to developing processing) recorded on a photographic photosensitive material (hereinafter referred to merely as a "photographic film") which is, for example, a photographic film (e.g., a negative film or a reversal film), is read and is recorded onto a photographic printing paper.

The input device group 18 is structured by different types of input devices which input image data to the image data exchanger 14. Examples of the input devices forming the input device group 18 are an information storage medium reading device 22 (see FIG. 3), a communications control device (not illustrated) which receives and inputs image data sent from another information processing equipment connected thereto via a communications line, or the like. Any of various types of image storage media, such as magnetic disks such as floppy disks (FDs), optical disks such as CD-Rs, magneto-optical disks (MOs), PC cards or IC cards (hereinafter "digital camera cards") loadable into digital still cameras (DSCs, hereinafter "digital cameras"), are set at the information storage medium reading device 22. The information storage medium reading device 22 reads and inputs the image data stored on the information storage medium set thereat.

The output device group 20 is formed by different types of output devices which carry out image output processing on the basis of image data for output which is transferred thereto from the image data exchanger 14. Examples of the output devices forming the output device group are an information storage medium writing device which, as the image output processing, writes image data onto an information storage medium such as a CD-R (e.g., a CD-R writer 24 shown in FIG. 3 which writes image data onto a CD-R which serves as the information storage medium); an image display device which, as the image output processing, displays the image on a display means such as a display; a communications control device which, as the image output processing, transmits image data to another information processing equipment connected thereto via a communications line; or the like.

The file structures of the image data inputted from the respective input devices forming the input device group 18 are not the same, and often differ from one another. Therefore, when image data is inputted to the I/F circuit 16 from the input device, the I/F circuit 16 determines the file structure of the inputted image data, converts the inputted image data into a predetermined file structure, and inputs to the image data exchanger 14 the inputted image data converted into a file structure. Further, although the file structure of the image data transferred to an output device from the exterior is specified in advance, the file structures often differ from output device to output device among the output devices forming the output device group 20. Thus, in a case in which image data is transferred from the image data exchanger 14 to an output device, the I/F circuit 16 converts the file structure of the image data to be transferred to a file structure corresponding to the output device which is to receive the transfer (the output device which is the transfer location).

Figure 2:
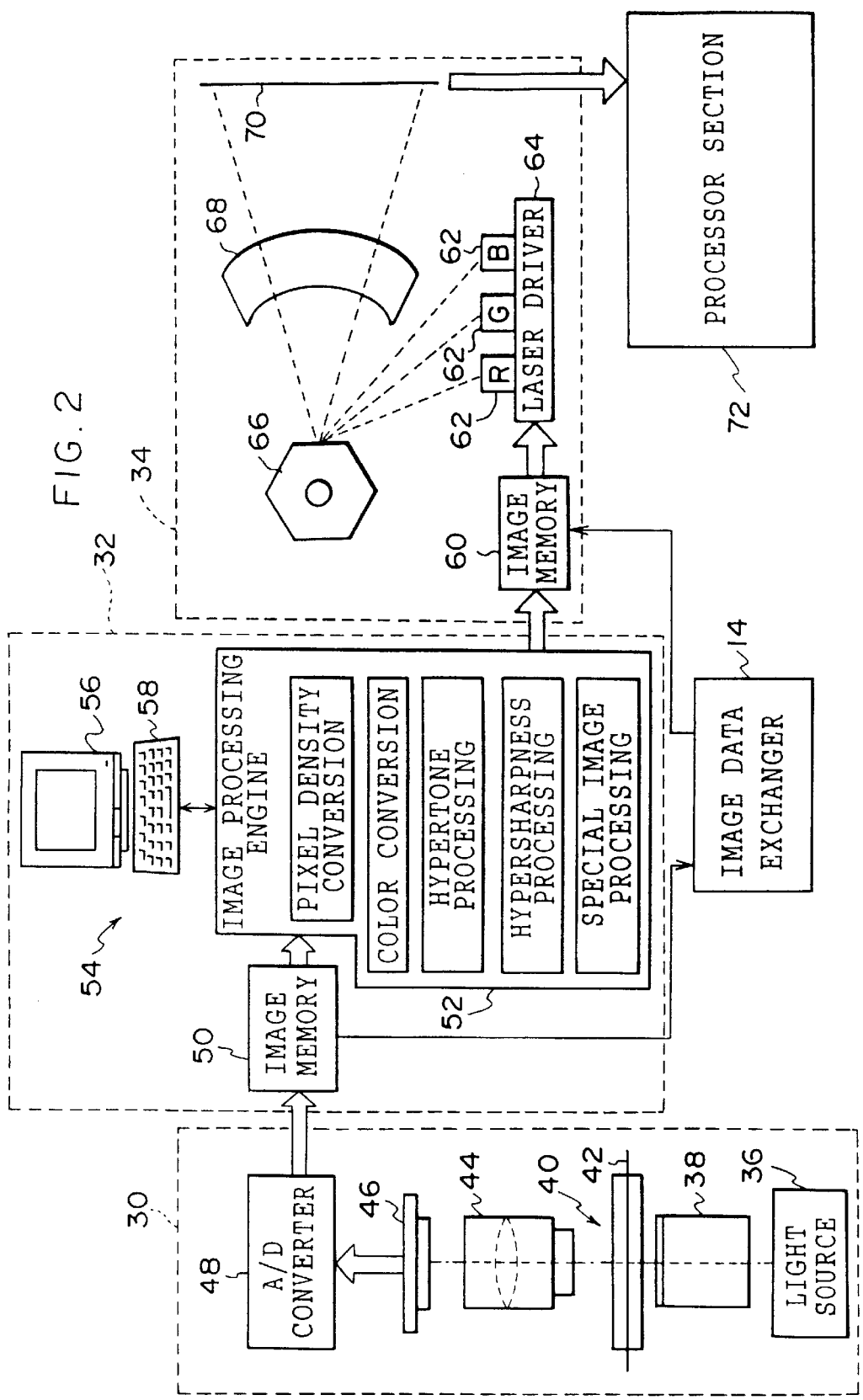
FIG. 2 is a schematic structural view illustrating a digital lab system which is one portion of the image processing system of FIG. 1.

The digital lab system 12 is formed by a scanner 30, an image processing device 32, and a printer 34 which are connected in series. The scanner 30 reads a film image recorded on a photographic film, and outputs the image data obtained by this reading. As illustrated in FIG. 2, light, which is emitted from a light source 36 and from which unevenness in the light amount has been eliminated due to a light diffusing box 36, is illuminated onto a photographic film 42 such as a negative film or a reversal film set at a film carrier 40. The light transmitted through the photographic film 42 is focused onto the light-receiving surface of an area CCD sensor 46 via a lens 44.

The film carrier 40 conveys the photographic film 42 intermittently such that the places on the photographic film 42 at which film images are recorded are positioned successively on the optical axis of the light emitted from the light source 36. In this way, the film images recorded on the photographic film 42 are read in order by the area CCD sensor 46, and signals corresponding to the film images are outputted from the area CCD sensor 46. The signals outputted from the area CCD sensor 46 are converted into digital image data by an A/D converter 48, and are inputted to the image processing device 32. The scanner 30 corresponds to the input device of the present invention (more specifically, to the first input device of the fourth aspect).

The image processing device 32 comprises an image memory 50, an image processing engine 52, and a verification device 54. The image data inputted from the scanner 30 is temporarily stored in the image memory 50. Among the image data stored in the image memory 50, the large number of image data which is to be used in the image outputting processing carried out by the printer 34 (i.e., the recording of the image onto photographic printing paper) are inputted to the image processing engine 52.

The image processing engine 52 is equipped with various types of image processing circuits which subject the inputted image data to various types of image processings as image processings for exposing and recording the image onto a photographic printing paper at the proper image quality. Examples of these various types of image processings are image density conversion, color conversion, hypertone processing for compressing the gradation of the super-low frequency brightness components of the image, hypersharpness processing for enhancing the sharpness while suppressing graininess, and special image processings (e.g., correction of "red-eye" or correction of deterioration in image quality due to aberration of an LF lens with respect to a film image which is photographed and recorded by an LF (lens-fitted film package)). The processing conditions of the image processings carried out at the image processing circuits are computed in the interior of the image processing engine 52, and the verification device 54 is notified of the computed processing conditions.

The verification device 54 is formed by a personal computer or the like, and is equipped with a display 56 and a keyboard 58. On the basis of the processing conditions notified from the image processing engine 52, the verification device 54 estimates the finished state of the image at the time that the various types of image processings are carried out on the image data under the notified processing conditions and the image is recorded onto an image recording material. By displaying the results of estimation on the display 56 as a simulation image, an operator can verify whether the processing conditions are appropriate or not. When the operator designates corrections of the processing conditions via the keyboard 58 or the like, after the processing conditions have been corrected in accordance with the designations, the image processing engine 52 carries out various types of image processings on the image data in accordance with processing conditions that have been decided upon through the verification operation, and outputs the image data which has been subjected to the image processings to the printer 34 as image data for recording.

The printer 34 is equipped with an image memory 60, R, G, B laser light sources 62, and a laser driver 64 which controls the operation of the laser light sources 62. The image data for recording which has been inputted from the image processing device 32 is temporarily stored in the image memory 60, and thereafter, is read, and is used to modulate the R, G, B laser light emitted from the laser light sources 62. The laser light emitted from the laser light sources 62 is scanned onto a photographic printing paper 70 via a polygon mirror 66 and an fθ lens 68, such that an image is exposed and recorded on the photographic printing paper 70. The photographic printing paper 70 on which the image has been exposed and recorded is sent to a processor section 72 and is subjected to various processings such as color developing, bleaching fixing, washing and drying. In this way, the image which has been exposed and recorded on the photographic printing paper 70 is made visible.

Image data which has been transferred to the printer 34 from the image converter 14 is also temporarily stored in the image memory 60, and thereafter, in the same way as described above, is used for modulation of laser light, i.e., exposing and recording of an image onto the photographic printing paper 70. In this way, the printer 34, together with the processor section 72, correspond to the output device of the present invention (more specifically, to the first output device of the fifth aspect).

Among the film images recorded on the photographic film 42 which is brought into and is to be processed at the digital lab system 12, there are film images whose image data has been designated by the user for use in image output processing to be carried out by output devices other than the printer 34 (output devices forming the output device group 20 connected to the image data exchanger 14 via the I/F circuit 16). The output location of this image data (i.e., the output device which is to carry out image output processing) is set by the operator operating the keyboard 58. In this way, among the image data stored in the image memory 50 of the image processing device 32, there is image data of film images which have been designated for use in image output processings carried out by output devices other than the printer 34. This image data is outputted to the image processing engine 52 and is subjected to image processing for recording and exposing the image onto the photographic printing paper 70, and is also inputted to the image data exchanger 14 from the image memory 50.

As illustrated in FIG. 1, the image data exchanger 14 includes an information processing device and a hard disk device 88. The information processing device is a personal computer or a work station or the like, and is structured such that a CPU 78, a ROM 80, a RAM 82, and input/output ports 84A, 84B are connected together by a bus 86. The hard disk device 88 is equipped with a large capacity information storage medium (hard disk) and is connected to the bus 86. The scanner 30 of the digital lab system 12 (more specifically, the image memory 50 of the image processing device 32) and the printer 34 are connected to the input/output port 84A. The input device group 18 and the output device group 20 are connected to the input/output port 84B via the I/F circuit 16.

The image data exchanger 14 temporarily stores, in the hard disk of the hard disk device 88, the image data inputted from the scanner 30 and the respective input devices of the input device group 18. Accordingly, the hard disk of the hard disk device 88 functions as a spool 90 (see FIG. 3) which accumulates and stores the image data inputted to the image data exchanger 14. The hard disk device 88 corresponds to the storing means of the present invention. Further, the image data exchanger 14 adds property information to the inputted image data before temporarily storing the image data in the spool 90. In the example shown in FIG. 4, the property information is formed from a header portion, a basic property portion, and a detailed property portion. The inputted image data is temporarily stored in the spool 90 after having been made into a file structure in which the aforementioned property information is added to the image data portion forming the image data.

In the property information, information such as the file name and the like is set in the header portion. Information expressing the basic attributes of the image data, such as the number of pixels along the transverse direction (W: long side direction) and the heightwise direction (H: short side direction) of the image, the color space of the image data, the number of bits per channel of one pixel (bit depth), the number of channels, and the like are set in the basic property portion. Further, information expressing detailed attributes of the image data which are necessary for image processings such as image structure conversion and color space conversion and the like of the image data are set in the detailed property portion.

Various types of programs for carrying out the various image processings on the image data are stored in the ROM 80 of the image data exchanger 14. The CPU 78 selectively executes these programs as needed at predetermined times (a time which is at least one of before the image data is temporarily stored in the spool 90 and after the image data temporarily stored in the spool 90 is read), and carries out image processings on the image data. In this way, the image data exchanger 14 is also equipped to function as an image processing engine 92 (see FIG. 3). The image processing engine 92 corresponds to the image processing means of the present invention, and also serves as the adding means of the third aspect (as will be described in detail later).

Figure 3:
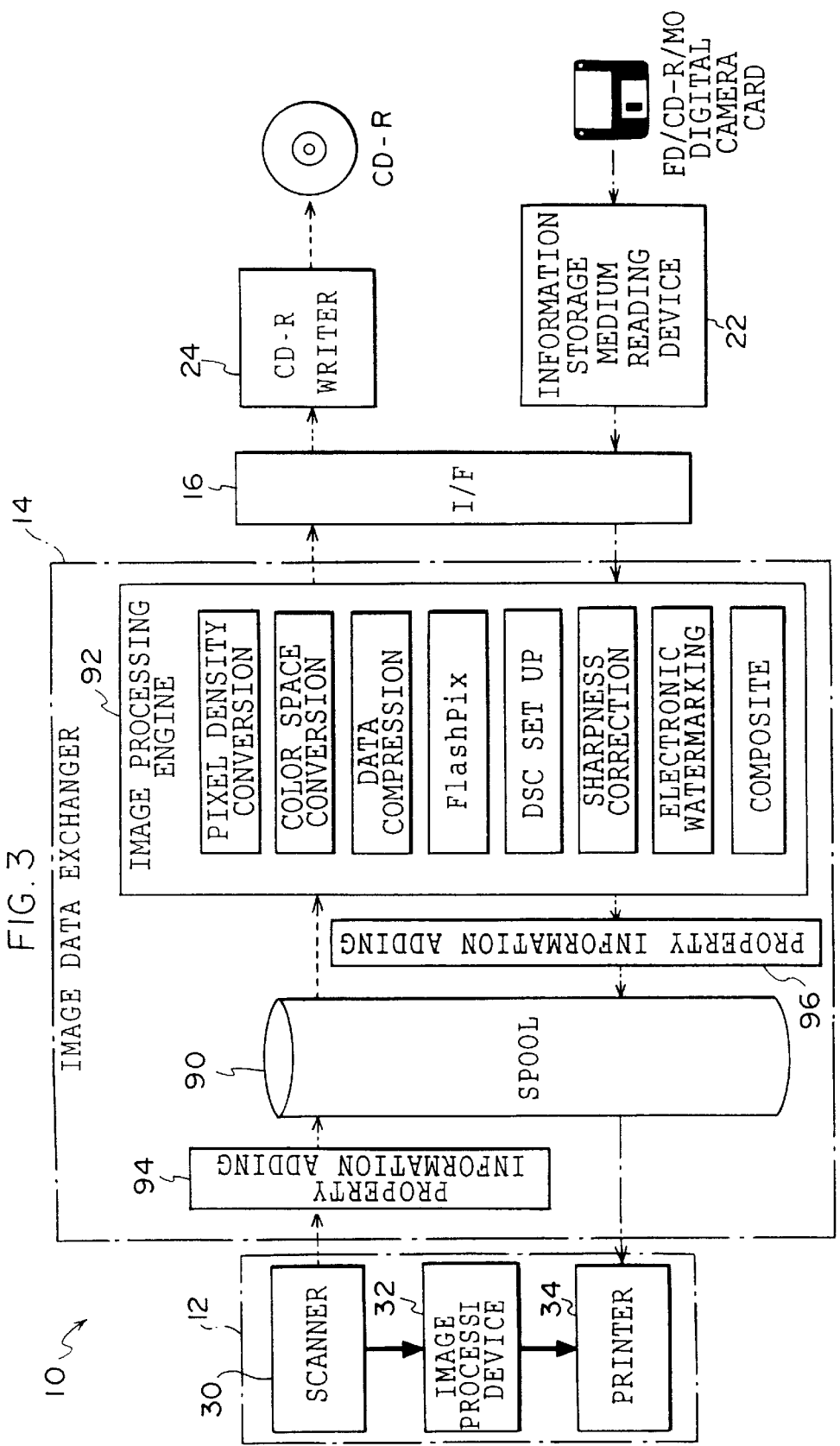
FIG. 3 is a schematic view illustrating, in the image processing system of FIG. 1, a flow of processing of image data in a case in which an information storage medium reading device serving as a second input device and a CD-R writer serving as a second output device are connected.

As illustrated in FIG. 3, various types of image processings are readied as the image processings of the image data in the present embodiment. Such image processings include "pixel density conversion" for converting to image data of a different pixel density (number of pixels), "color space conversion" for converting to image data of a different color space, "data compression (or decompression)", "FlashPix formatting" for conversion into (or conversion from) image data of a predetermined format called FlashPix (a format including image data of plural different types of resolutions (pixel densities) wherein the image data of the different resolutions are divided into plural small regions (called tiles)), "DSC set-up" which is processing for improving the image quality which is exclusively used for image data obtained by photographing by use of a digital camera, "sharpness correction" for improving the sharpness of an image, "electronic watermarking" for embedding predetermined electronic watermarking data in order to prevent improper reproduction of image data, "Composite" for synthesizing plural types of image data to generate image data of a single image (e.g., image data for creating original greeting cards or the like), and the like.

Next, as operation of the present first embodiment, a description will be given of an example wherein, in an aspect (see FIG. 3) in which the information storage medium reading device 22 and the CD-R writer 24 are connected to the image data exchanger 14, conversion of image data between, on the one hand, the digital lab system 12, and, on the other hand, the information storage medium reading device 22 and the CD-R writer 24, is carried out. (More specifically, image data is transferred from the scanner 30 to the CD-R writer 24, and image data is transferred from the information storage medium reading device 22 to the printer 34.) In this aspect, the information storage medium reading device 22 corresponds to the input device of the present invention (more specifically, the second input device of the sixth aspect), and the CD-R writer 24 corresponds to the output device of the present invention (more specifically, the second output device of the seventh aspect).

The image data exchanger 14 provides to an external device a function and a getImage function, as commands for the various input devices and output devices to carry out conversion of image data via the image data exchanger 14.

The putImage function is used when an input device is to input image data to the image data exchanger 14, and the getImage function is used when an output device is to fetch data (i.e., make data be outputted) from the image data exchanger 14.

The photographic film 42 to be processed is brought into the digital lab system 12. The film images recorded on the photographic film 42 to be processed are read successively by the scanner 30. The majority of the image data obtained by this reading are outputted to the printer 34 through the image processing at the image processing device 32 (refer to the thick arrows connecting the scanner 30, the image processing device 32, and the printer 34 in FIG. 3), and are used for exposing and recording the images onto the photographic printing paper 70.

However, for image data of film images for which a specific output device other than the printer 34 is set as the output location (here, the CD-R writer 24 is set as the output location) by the user designating that output is to be made to the specific output device and the operator operating the keyboard 58 in accordance with the user's designation, in order to input this image data to the image data exchanger 14 as well, the scanner 30 calls up the putImage function by using as an argument the attribute information expressing the various attributes of the image data and the information expressing that the output location of the image data is the CD-R writer 24. Note that the keyboard 58 corresponds to the designating means of the present invention.

Figure 4:
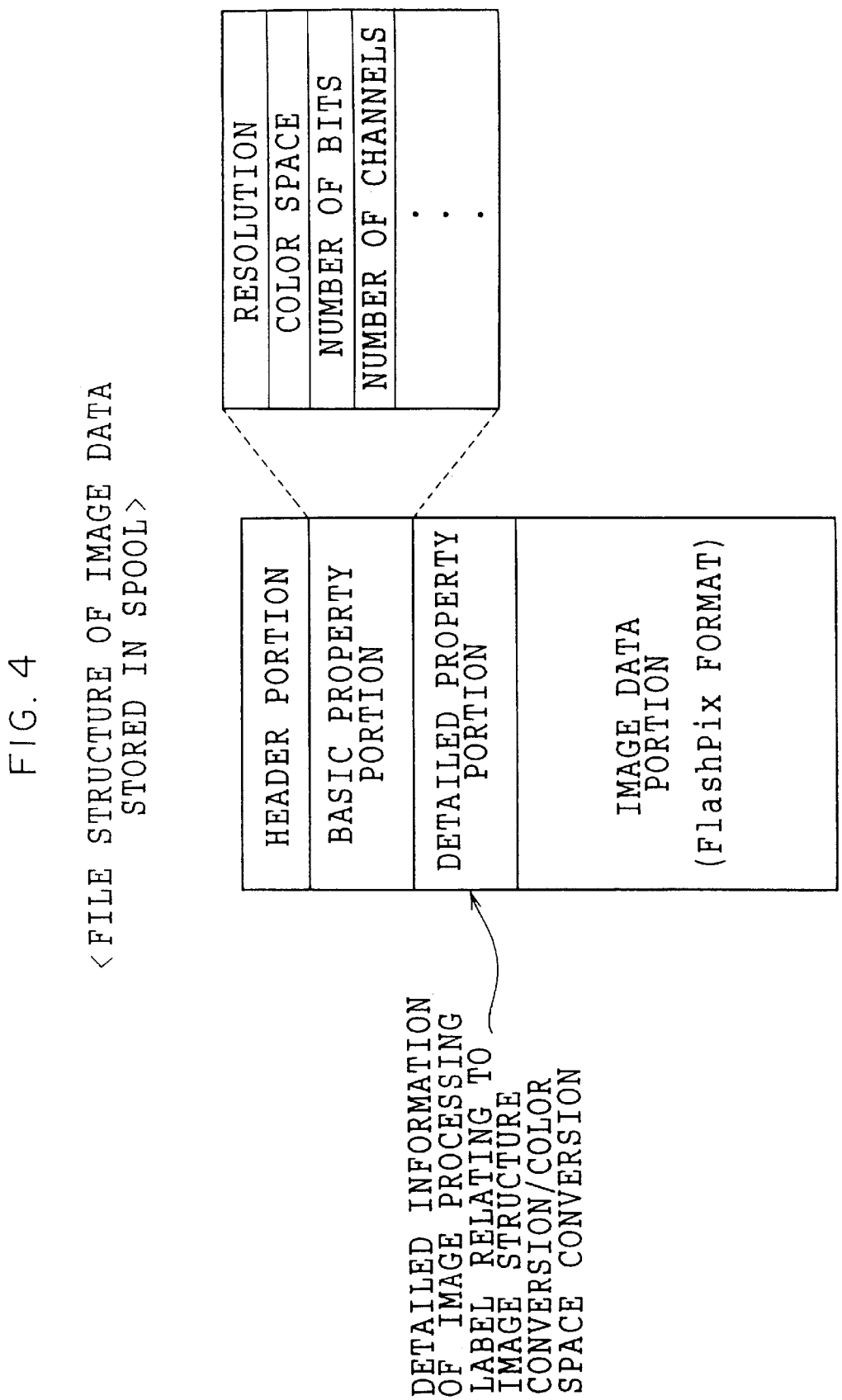
FIG. 4 is a schematic view illustrating a file structure of image data stored in a spool.

When the putImage function is called from the scanner 30 of the digital lab system 12, the (CPU 78 of the) image data exchanger 14 converts the image data inputted by the putImage function into a file structure to which a header portion, a basic property portion and a detailed property portion are added as shown in FIG. 4. Next, the attribute information of the image data, which was transferred from the scanner 30 as the argument of the putImage function, and the information (hereinafter "input source/output location information"), which expresses that the inputted image data has been inputted from the scanner 30 and is to be outputted to the CD-R writer 24, are set in the basic property portion and the detailed property portion. Information such as the file name or the like is set in the header portion. Then, the image data, to which the property information has been added, is stored in the spool 90.

FIG. 3 illustrates the function for carrying out the above-described processing as a property information adding section 94. Among the above-described processings, the processings other than the process of storing the image data in the spool 90 (i.e., the file structure conversion, the setting of the attribute information and the input source/output location information, and the like) correspond to the adding means of the present invention. Further, the flow of the image data until the image data outputted from the scanner 30 is temporarily stored in the spool 90 corresponds to the dashed arrows extending from the scanner 30 via the property information adding section 94 to the spool 90 in FIG. 3.

The image processing engine 92 refers to the property information of the image data stored in the spool 90. When it is recognized, from the input source/output location information, that the image data stored in the spool 90 is image data which has been inputted from the scanner 30 and is to be outputted to the CD-R writer 24, no image processing is carried out on this image data.

In this way, when image data is inputted from the scanner 30, the inputted image data is not subjected to image processing by the image processing engine 92 before being stored in the spool 90, and is stored in the spool 90 after only simple processings such as the conversion of the file structure and the setting of the attribute information and the like have been carried out. Thus, by inputting the image data to the image data exchanger 14, a reduction in the amount of processing by the scanner 30 per unit time and a reduction in the operation rate can be prevented.

In the image data exchanger 14, when the image data inputted from the scanner 30 is stored in the spool 90, the CD-R writer 24, which is the output location of the image data, is notified that image data which is to be outputted to the CD-R writer 24 is stored in the spool 90. In this way, the CD-R writer 24 makes preparations for the writing of the image data onto a CD-R which is the object of image data writing, and thereafter, when the preparations have been completed, the CD-R writer 24 calls up the getImage function by using as an argument the file name of the image data which is to be fetched from the spool 90 of the image data exchanger 14.

When the getImage function is called up, by using the file name transferred as the argument as a key, the image data exchanger 14 retrieves the image data for which fetching from the spool 90 was instructed, and fetches the image data from the spool 90. The image processing engine 92 refers to the property information of the image data which is to be fetched from the spool 90, but, at this time, information expressing that image processing has been carried out on the image data to be processed is not set in the property information. (This information is set in the property information each time image processing is carried out.) Therefore, it is determined that no image processing has been carried out on the image data fetched from the spool 90, and appropriate image processings, which correspond to the output location (the CD-R writer 24) and to the attributes of the image data to be processed which depend on the input source (the scanner 30), are carried out.

Figure 5:
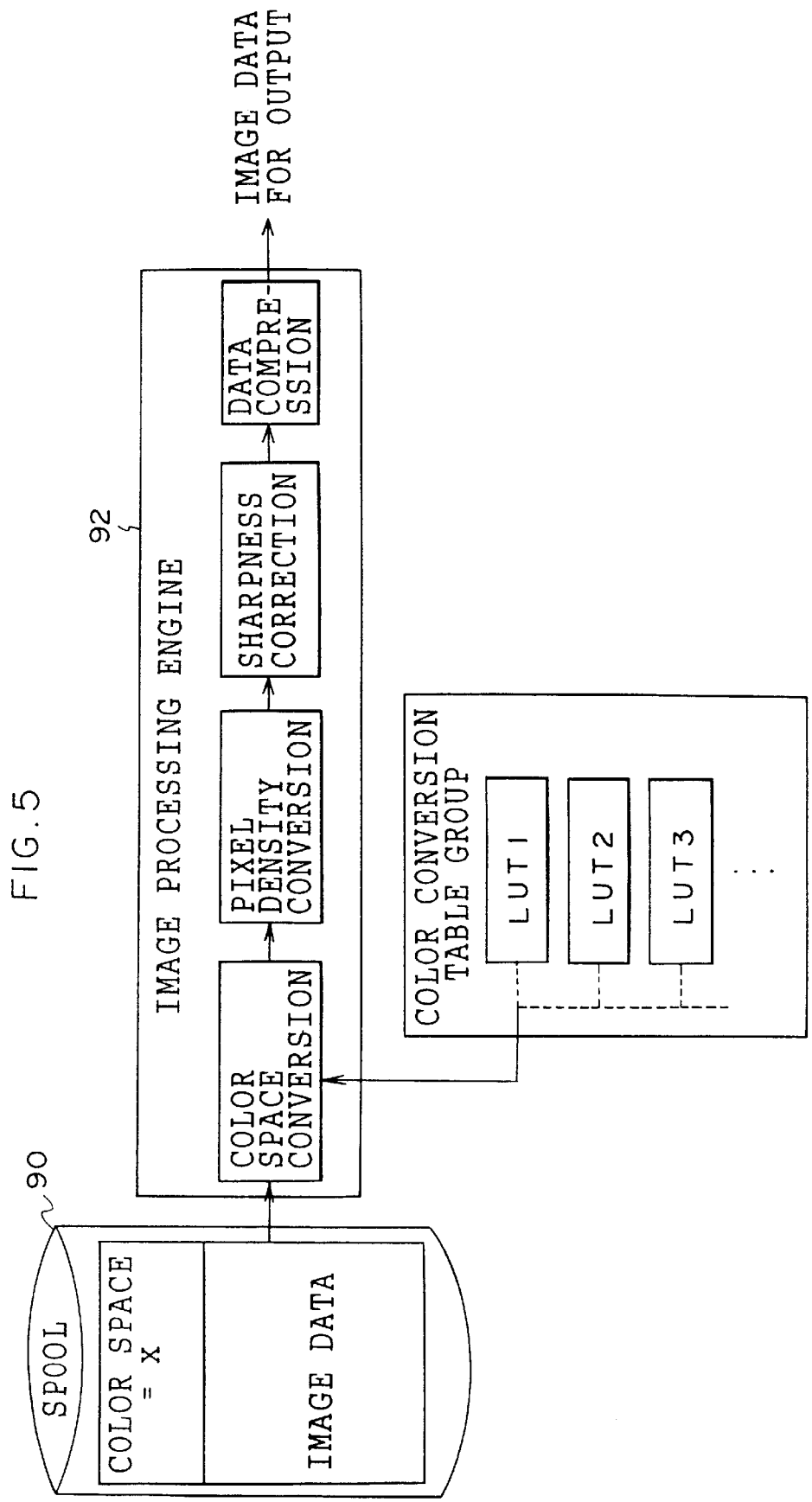
FIG. 5 is a schematic view for explaining an example of image processing at an image processing engine in a case in which image data inputted from a scanner is transferred to a CD-R writer.

The image processing engine 92 carries out in order the respective image processings "color space conversion", "pixel density conversion", "sharpness correction", and "data compression" shown in FIGS. 5 and 6, on the image data inputted from the scanner 30 and to be outputted to the CD-R wrier 24. Although not shown, other image processings such as "FlashPix formatting" and the like are also carried out. Further, on the basis of the attribute information set as the property information, the image processing engine 92 carries out the respective image processings at appropriate processing conditions in accordance with the attributes of the image data to be processed. At this time, because the respective image processings are carried out on the basis of the attribute information, the image processings correspond in particular to the image processings carried out by the image processing means in the second aspect.

For example, "color space conversion" is carried out as follows. The image data written on a CD-R is usually used for display onto a CRT monitor. Thus, it is preferable that the image data written onto the CD-R by the CD-R writer 24 is made to correspond to the appearance of a print which is obtained by the image being displayed at a preferable image quality on a CRT monitor without being subjected to any special after-processings when displayed on the CRT monitor, i.e., which is obtained by the image being exposed and recorded onto a photographic printing paper. Therefore, in the present first embodiment, when the RGB image data particular to the scanner, which are inputted from the scanner, are written onto a CD-R, the RGB image data is converted into color space s-RGB image data. The color space s-RGB is a color space which is determined such that an image displayed on a CRT can be viewed at a preferable image quality when inspected inside.

The attributes (characteristics) of the image data obtained by the scanner reading the film image recorded on the photographic film are converted in accordance with the type of the scanner which read the film image (characteristics of scanners, such as spectral sensitivity, differ in accordance with the type of scanner) or in accordance with the type of photographic film which was read (e.g., whether the film is a negative film or a reversal film). Thus, in order to properly convert image data by using the "color space conversion", in the present embodiment, as illustrated by the color space table group in FIG. 5, a plurality of conversion tables (look-up tables, or LUTs), which are for converting the RGB image data particular to the scanner and inputted from the scanner into color space s-RGB image data, are set in accordance with the types of scanners and photographic films. (Refer to LUT1, LUT2, LUT3 in FIG. 5.)

At the time the image data is inputted from the scanner 30, the image data exchanger 14 is notified of the type of the photographic film and the type of the scanner 30 which read the film image. At the property information adding section 94 of the image data exchanger 14, different codes are set, in accordance with the notified type of scanner 30 and type of photographic film, in "color space" which is one item of information belonging to the basic property portion. Accordingly, the image processing engine 92 refers to the "color space" set in the basic property portion of the image data to be processed, recognizes the type of the scanner and the type of the photographic film, and utilizes a conversion table corresponding to the recognized type of scanner and type of photographic film to carry out color space conversion of the image data to be processed.

More specifically, for example, in a case in which "color space=1" is set in the basic property portion of the image data to be processed ("color space=1" means that "the image data to be processed is image data which was obtained by scanner A reading a reversal film"), the LUT1 for converting the image data of "color space=1" to color space s-RGB image data is selected, and color space conversion is carried out.

Further, in a case in which "color space=2" is set in the basic property portion of the image data to be processed ("color space=2" means that "the image data to be processed is image data which was obtained by scanner A reading a negative film"), the LUT2 for converting the image data of "color space=2" to color space s-RGB image data is selected, and color space conversion is carried out.

In a case in which "color space=3" is set in the basic property portion of the image data to be processed ("color space=3" means that "the image data to be processed is image data which was obtained by scanner B reading a reversal film"), the LUT3 for converting the image data of "color space=3" to color space s-RGB image data is selected, and color space conversion is carried out.

In this way, color space conversion is carried out under optimal processing conditions which correspond to the attributes to the image data to be processed. Further, when the image processing engine 92 carries out color space conversion as described above, information expressing that color space conversion has been carried out is set in the basic property portion or in the detailed property portion (corresponding to the adding means of the third aspect).

For example, in a case in which there are two types of services for writing image data onto a CD-R, a service A (in which it is possible to output images at high quality from a CD-R with few images (frames) writable onto the single CD-R) and a service B (in which it is possible to write many images onto a single CD-R in which the image quality of the images outputted from the CD-R is slightly inferior), "pixel density conversion" and "data compression" can be carried out as follows.

Namely, to realize service A and service B as services for writing image data onto CD-Rs, in the present first embodiment, as illustrated by the pixel density conversion switch in FIG. 6, it is possible to select whether "pixel density conversion" is to be "on" (i.e., implemented) or "off" (i.e., not carried out). Further, as illustrated by the coding table group in FIG. 6, plural types of coding tables for carrying out "data compression" are available in accordance with various different types of compression rates.

When the image data is inputted from the scanner 30, the image data exchanger 14 is notified of the number of pixels of the image data to be processed. In the property information adding section 94 of the image data exchanger 14, the notified number of pixels is set as "number of pixels" which is one item of information belonging to the basic property portion. The type of service to be used when writing image data onto a CD-R (i.e., service A or service B) is set by an operator operating a keyboard 58 in accordance with instructions from the user, is notified to the image data exchanger 14 simultaneously with the notification of the number of pixels of the image data, and is set as property information. Accordingly, by referring to the property information of the image data to be processed, the image processing engine 92 recognizes the number of pixels of the image data to be processed, and recognizes the type of service which is to be carried out. In accordance with the recognized number of pixels and type of service to be carried out, the image processing engine 92 selectively carries out pixel density conversion and selects a coding table to be used for data compression and carries out data compression.

More specifically, let us suppose that service A is a service in which image data of a number of pixels of 2000 (W)× 1500 (H) is compressed at a low compression rate and written onto a CD-R, and that service B is a service in which image data of a number of pixels of 1000 (W)×750 (H) is compressed at a high compression rate and written onto a CD-R. In this case, as illustrated in FIG. 6, when "number of pixels (W)=2000" and "number of pixels (H)=1500" and information instructing that service A be used are set in the basic property portion of the image data to be processed, the pixel density conversion switch is set to "off" such that pixel density conversion is not carried out, and a coding table of a low compression rate is selected as the coding table and data compression is carried out.

Further, when "number of pixels (W)=2000" and "number of pixels (H)=1500" and information instructing that service B be used are set in the basic property portion of the image data to be processed, the pixel density conversion switch is set to "on", and pixel density conversion is carried out such that the number of pixels (pixel density) of the image data to be processed becomes ½, which is the ratio between the target number of pixels of image data in service B and the number of pixels of the image data to be processed. Further, a coding table of a high compression rate is selected as the coding table and data compression is carried out.

In this way, pixel density conversion and data compression are carried out under optimal processing conditions corresponding to the attributes of the image data to be processed and the type of service to be carried out. When the image processing engine 92 carries out pixel density conversion and data compression as described above, information expressing that pixel density conversion and data compression have been carried out is set in the basic property portion or in the detailed property portion. (This setting corresponds to the adding means of the third aspect.)

The image data, for which image processing at the image processing engine 92 has been completed, is transferred from the image data exchanger 14 to the CD-R writer 24. (This transmission corresponds to the transfer means of the present invention.) The image data is converted by the I/F circuit 16 into a file structure which corresponds to the CD-R writer 24, and thereafter, is inputted to the CD-R writer 24. Then, the inputted image data is written onto a CD-R by the CD-R writer 24. The flow of image data until the image data read from the spool 90 is outputted to the CD-R writer 24 corresponds to the dashed arrows in FIG. 3 which run from the spool 90 via the image processing engine 92 and the I/F circuit 16 to the CD-R writer 24.

The image data exchanger 14 carries out image processing on the image data, which was inputted from the scanner 30 and is to be outputted to the CD-R writer 24, after the image data temporarily stored in the spool 90 is fetched (corresponding to the inventions of the fourth and sixth aspects). Thus, there is a relatively long period of time until the image data fetched from the spool 90 is transferred to the CD-R writer 24. However, in the image processing system 10 of the present first embodiment, the amount of processing by the CD-R writer 24 is small as compared to that of the scanner 30 of the digital lab system 12 or the printer 34, and there is no need for the CD-R writer 24 to operate at high-speed and a high operation rate. Thus, the relatively long period of time until the image data fetched from the spool 90 is transferred to the CD-R writer 24 has little effect on the total processing time of the image processing system 10.

Next, the transfer of image data from the information storage medium reading device 22 to the printer 34 will be described. In the image processing system 10 of the present first embodiment, there exist the following cases. An FD or an MO, on which is stored image data that a user has processed at their own information processing device such as their own personal computer, is brought to the image processing system 10, and the making of prints from the FD or MO is requested. A digital camera card, on which is stored image data obtained by photographing by use of a digital camera, is brought to the image processing system 10, and the making of prints from the digital camera card is requested. A CD-R, on which is written image data which has been transferred from the scanner 30 via the image data exchanger 14 and the CD-R writer 24 (such as the case described above), is brought to the image processing system 10, and the making of prints (reprints) from the CD-R is requested In such cases, the information storage medium brought in by the user is set at the corresponding information storage medium reading device 22 (one of an FD drive, a CD drive, an MO drive, a card reader, or the like). The information storage medium reading device 22 at which the information storage medium is set reads the image data to be processed from the set information storage medium, and thereafter, calls up the putImage function by using, as the argument, attribute information expressing the various attributes of the image data to be processed and information expressing that the output location of the image data is the printer 34. In this case, the information storage medium reading device 22 functions as the setting means of the present invention.

The image data, for which the putImage function was called up and which is outputted from the information storage medium reading device 22, is converted into a predetermined file structure at the I/F circuit 16, and thereafter, is inputted to the image data exchanger 14. From information expressing that the call-up source of the putImage function (the input source of the image data) is the information storage medium reading device 22 and expressing the image data output location transferred as the argument of the putImage function, the image processing engine 92 of the image data exchanger 14 recognizes that the inputted image data to be processed is image data which is to be outputted to the printer 34. Before the image data to be processed is stored in the spool 90, the image processing engine 92 carries out optimal image processings corresponding to the output location (printer 34) and to the attributes of the image data to be processed which depend on the input source (the type of information storage medium reading device 22).

For example, image data processed by an information processing device such as a personal computer and image data written onto a CD-R by the present image information system 10 are color space s-RGB image data. Such data is converted into FlashPix format and subjected to data compression, and is stored on an FD, MO or CD-R. Thus, if the information storage medium reading device 22 is a device for reading image data from an FD or an MO or is a device for reading image data from a CD-R, the image processing engine 92 carries out image processings such as decompressing the compressed image data, converting from the FlashPix format in order to obtain image data of a data sequence and a resolution (pixel density) suitable for recording an image onto the photographic printing paper 70, converting from the color space s-RGB (i.e., converting to image data of a color space suitable for recording the image onto the photographic printing paper 70 by the printer 34) and the like.

Further, there are cases in which the density, the color balance and the like of the image data stored on a digital camera card by a digital camera are not optimal due to the image data being subjected to data compression in a format other than FlashPix, the resolution of the image data being different than a resolution which is suitable for recording the image onto a photographic printing paper 70, and errors in the automatic exposure control or the automatic white balance control of the digital camera. Further, in some inexpensive digital cameras, the sharpness of the image represented by the image data is insufficient due to effects such as aberration of the lens or the like.

Therefore, when the information storage medium reading device 22 is a device for reading image data from a digital camera card (i.e., a card reader), the image processing engine 92 carries out image processings such as decompressing the compressed image data, converting into image data of a resolution (pixel density) appropriate for recording the image onto the photographic printing paper 70, "DSC set up" which is a processing for improving the image quality and is used exclusively for image data obtained by photographing by a digital camera, "sharpness correction" for improving the sharpness of the image, and the like.

When the above image processings by the image processing engine 92 have been completed, the image data exchanger 14 converts the image data to be processed into a file structure (see FIG. 4) to which are added a basic property portion and a detailed property portion. The image data exchanger 14 sets, in the basic property portion or the detailed property portion, image data attribute information transferred as the argument of the putImage function from the information storage medium reading device 22 which is the input source, input source/output location information, and information expressing that the various types of image processings have been carried out (this corresponds to the adding means in the third aspect), and sets information such as the file name and the like in the header portion. Thereafter, the image data is temporarily stored in the spool 90.

In FIG. 3, the function for carrying out the aforementioned processings is illustrated as a property information adding section 96. Among the above-described processings, the processings other than the process of storing the image data in the spool 90 (e.g., the conversion of the file structure, the setting of the attribute information and the input source/ output location information) correspond to the adding means of the present invention. The flow of the image data until the image data outputted from the information storage medium reading device 22 is temporarily stored in the spool 90 corresponds in FIG. 3 to the one-dot chain line arrows extending from the information storage medium reading device 22 via the I/F circuit 16, the image processing engine 92, and the property information adding section 96 to the spool 90.

The image data exchanger 14 carries out image processings on the image data, which is inputted from the information storage medium reading device 22 and is to be outputted to the printer 34, before the image data is temporarily stored in the spool 90. (This corresponds to the fifth and seventh aspects of the present invention.) Thus, there is a relatively long period of time until the image data inputted from the information storage medium reading device 22 is temporarily stored in the spool 90. However, in the image processing system 10 of the present first embodiment, the amount of processing by the information storage medium reading device 22 is small as compared to that of the scanner 30 of the digital lab system 12 or the printer 34, and there is no need for the information storage medium reading device 22 to operate at high-speed and a high operation rate. Thus, the relatively long period of time until the image data inputted from the information storage medium reading device 22 is temporarily stored in the spool 90 has little effect on the total processing time of the image processing system 10.

At the image data exchanger 14, when the image data inputted from the information storage medium reading device 22 is stored in the spool 90, the printer 34, which is the output location of the image data, is notified that image data to be output to the printer 34 is stored in the spool 90. The printer 34 calls up the getImage function by using, as the argument, the file name of the image data which is to be fetched from the spool 90 of the image data exchanger 14.

When the getImage function is called up, by using the file name transferred as the argument as a key, the image data exchanger 14 retrieves the image data for which fetching from the spool 90 was instructed, and fetches the image data from the spool 90 and transfers the image data to the printer 34. (This corresponds to the transfer means of the present invention.) The image processing engine 92 refers to the property information of the image data to be processed fetched from the spool 90. At this time, the information expressing that image processing has been carried out on the image data to be processed is set in the property information. Therefore, it is judged that the image data fetched from the spool has already been subjected to image processings, and the image data is transferred to the printer 34 without being subjected to any image processing. The flow of the image data until the image data fetched from the spool 90 is transferred to the printer 34 corresponds to the one-dot chain line from the spool 90 to the printer 34 in FIG. 3.

After the image data transferred from the image data exchanger 14 is stored in the image memory 60 of the printer 34, the image data is used for exposing and recording the image onto the photographic printing paper 70 so that a print is formed. In this way, for image data which is to be outputted to the printer 34, the image processing engine 92 carries out image processings on the inputted image data before the image data is stored in the spool 90, and does not carry out image processings after the image data has been fetched from the spool 90. Thus, by receiving image data from the image data exchanger 14, a decrease in the processing amount per unit time by the printer 34 and a decrease in the rate of operation of the printer 34 can be avoided.

As described above, the image data exchanger 14 governs not only the exchange of image data between the input devices and the output devices of the image processing system 10, but also subjects the inputted image data to optimal image processings which correspond to the attributes of the image data and to the output location of the image data. Thus, high-speed processing of the image processing system 10 and high image quality of images outputted from the output devices can be realized.

Second Embodiment

A second embodiment of the present invention will now be described. Portions of the second embodiment which are the same as those of the first embodiment are denoted by the same reference numerals, and description thereof is omitted. As illustrated in FIG. 7, in an image processing system 100 relating to the present second embodiment, a receiving device 102, which receives orders for the making of prints from image data stored on a digital camera card is connected to the input/output port 84B of the image data exchanger 14.

The receiving device 102 includes a CPU 104, a ROM 106, a RAM 108, and an input/output port 110, which are connected to one another by a bus 112. A display 114 for displaying images and a keyboard 116 for input of information by an operator are connected to the input/output port 110. Further, a card reader 120, which reads image data from digital camera cards, is connected to the input/output port 110 via an I/F circuit 118 which functions similarly to the I/F circuit 16 of the first embodiment.

In image processing system 100 of the present second embodiment, as illustrated in FIG. 8, two spools 90A, 90B are formed in a storage region of a hard disk of a hard disk device 88. The image data exchanger 14 temporarily stores in the spool 90A image data which has been inputted from the scanner 30 or from the input devices of the input device group 18 or from the receiving device 102. Thereafter, the image data exchanger 14 fetches image data from the spool 90A, and the fetched image data is subjected to image processings by the image processing engine 92 and is temporarily stored in the spool 90B. The image data exchanger 14 fetches the image data from the spool 90B, and transfers the fetched image data to the device which is the output location (the printer 34 or an output device of the output device group 20).

Transfer of image data from the receiving device 102 to the printer 34 will be described as operation of the present second embodiment. When a digital camera card is brought to the image processing system 100 and the formation of prints from the image data stored in the card is requested, an operator sets the digital camera card, which was brought in, at the card reader 120 of the receiving device 102, and instructs reading of the image data from the digital camera card. In this way, the card reader 120 reads the image data from the set digital camera card. After the read image data is converted into a predetermined file structure at the I/F circuit 118, the image data is stored in the RAM 108 via the input/output port 110.

A CPU 104 of the receiving device 102 subjects the image data, which was read from the digital camera card and stored in the RAM 108, to processings corresponding to a preprocessing section 122 shown in FIG. 8. Namely, the image data which was data compressed is decompressed, reduction processing (resolution conversion processing for lowering the resolution (pixel density)) is carried out in order to display the image on the display 114, and the image is displayed on the display 114. When the image is displayed on the display 114, the operator refers to the displayed image, and carries out the easy verification work of verifying whether or not the image quality with respect to only a predetermined image characteristic amount, such as the density, is appropriate. If it is determined that the image quality is appropriate, the operator inputs information expressing "verification OK" via the keyboard 116. If it is determined that the image quality is inappropriate, the operator inputs correction parameters for correcting the density or the like via the keyboard 116.

When the verification operation is completed, the receiving device 102 calls up a putImage function for the image data, which was read by the digital card reader and decompressed, by using as an argument attribute information expressing the attributes of the image data and information expressing that the output location of the image data is the printer 34. Further, when a correction parameter is inputted by the operator, the correction parameter inputted from the operator is also transferred to the image data exchanger 14 as an argument. In this case, the receiving device 102 functions as the setting means of the present invention.

Property information is added by a property information adding section 124 (corresponding to the adding means of the present invention) to the image data, which is inputted to the image data exchanger 14 from the receiving device 102 by the putImage function. The image data is then temporarily stored in the spool 90A. Thereafter, the image data is fetched, and is subjected to image processings such as "image density conversion", "DSC set up", "sharpness correction" and the like by the image processing engine 92. Here, when the correction parameter is transferred from the receiving device 102, "automatic density correction", which in accordance with the transferred correction parameter automatically corrects the density of the image expressed by the image data, is also carried out. The image data which has been subjected to image processing is temporarily stored in the spool 90B, and thereafter, is fetched in accordance with the getImage function call, and is transferred to the printer 34. Then, the image data is used for exposing and recording an image onto the photographic printing paper 70 at the printer 34.

As described above, in the present second embodiment, for the image data for which a correction parameter has been inputted by the verification work by the operator, the density is corrected in accordance with the inputted correction parameter. Therefore, when a print is prepared from the image data read from the digital camera card, the possibility of obtaining a print of an appropriate finish improves. Further, because the operator verifies only a predetermined image characteristic amount such as the density, verification of a large number of image data can be carried out in a short time.

Further, the receiving device 102 carries out only the minimum image processing for determining the correction amount for the reduced image data which is a small amount of data. At the image data exchanger 14 as well, image data, which is inputted from the receiving device 102 or from another input device of the input device group 18, is stored in the spool 90A without being subjected to image processing. Therefore, the number of image data which the receiving device 102 can process per unit time increases, and the other input devices as well can operate at high speed and a high rate of operation. In this way, the above-described flow of image data corresponds to the fourth aspect, the receiving device 102 or another input device corresponds to the first input device of the fourth aspect, and the spool 90A corresponds to the storing means of the fourth aspect.

Further, the two spools 90A and 90B are provided. The image data fetched from the spool 90A is subjected to image processing, and the image data which has been subjected to image processing is temporarily stored in the spool 90B. When the image data is fetched from the spool 90B and transferred to the printer 34 or another output device of the output device group 20, no image processing is carried out. Therefore, although there is the drawback that a device equipped with a large capacity hard disk must be used as the hard disk device 88, a decrease in the processing amount per unit time of the printer 34 and a decrease in the operation rate of the printer 34 can be avoided due to the receiving of image data from the image data exchanger 14. Further, the other output devices as well can operate at high speed and a high rate of operation. The above flow of image data corresponds to the fifth aspect, the printer 34 and the other output devices correspond to the first output device of the first aspect, and the spool 90B corresponds to the storing means of the fifth aspect.

In the above description, different image processings are carried out on the image data, which is read from the information storage medium, in accordance with the type of the read information storage medium (FD, MO/digital camera card/CD-R). However, the present invention is not limited to the same. For example, the attributes of image data differ in accordance with the type of the digital camera which stores the image data on the digital camera card. Thus, the image processings which are carried out may be changed in accordance with the type of the digital camera or the like.

As described above, in the first through the seventh aspects of the first invention and in the second invention, supplementary information, which includes information relating to the attributes of image data inputted from an input device, is added to the image data. Image processing, which corresponds to the attributes of the image data and to the output device to carry out the image output processing, is carried out on at least one of the image data which is temporarily stored in the storing means and the image data which, after having had the supplementary information added thereto and having been temporarily stored in the storing means, is read from the storing means. The image data, which after having been temporarily stored in the storing means was then read and then subjected to image processing and for which the image processing has been completed, is transferred to the output device as image data for output. Thus, an excellent effect can be achieved in that the processing speed is high and an output image of high image quality can be obtained.

In the third aspect of the present invention, in the first aspect, when the image processing means carries out a predetermined image processing on image data, the adding means adds, to the supplementary information of the image data, information expressing that the predetermined image processing has been carried out by the image processing means. Thus, in addition to the adove-described effects, there is the effect that the implementation of image processing can be managed easily even in cases in which there are plural types of image processings to be carried out on the image data, and the plural types of image processings are divided among and carried out by plural image processing means or are carried out non-simultaneously by the image processing system.

In the fourth aspect of the present invention, in the first aspect, image data, which is inputted from a first input device which is to operate at a high speed and a high operation rate, has supplementary information added thereto and is temporarily stored in the storing means. Thereafter, the image data is read from the storing means and is subjected to image processing. Thus, in addition to the adove-described effects, there is the excellent effect that image data can be received from an input device without leading to a great decrease in the processing speed or the rate of operation of the input device.

In the fifth aspect of the present invention, in the first aspect, image data, for which a first output device, which is to operate at a high speed and a high operation rate, is set as the output device to carry out image output processing, is subjected to image processing before being temporarily stored in the storing means. Thus, in addition to the above-described effects, an effect is achieved in that the image data can be transferred to the output device without leading to a decrease in the processing speed or the rate of operation of the output device.

In the sixth aspect of the present invention, in the first aspect, image data, which has been inputted from a second input device of which high-speed or high-operation-rate operation is not required, is subjected to image processing before being temporarily stored in the storing means. Thus, in addition to the above-described effects, there is the effect that the structure of the image processing system does not become complex.

In the seventh aspect of the present invention, in the first aspect, image data, for which a second output device, of which high-speed or high-operation-rate processing is not required, is set as the output device to carry out output processing, is temporarily stored in the storing means. Thereafter, the image data is read, image processing is carried out, and the image data is transferred. Thus, in addition to the above-described effects, there is the effect that the structure of the image processing system does not become complex.

What is claimed is:

1. An image processing system including at least one input device which inputs image data and at least one output device which, on the basis of transferred image data for output, carries-out image output processing, said image processing system comprising:

storing means for temporarily storing image data;

adding means for adding, to image data inputted from an input device, supplementary information including information relating to attributes of the image data;

setting means for setting an output device which is to carry out image output processing on the image data;

image processing means for carrying out image processing, which corresponds to the attributes of the image data and to the output device which is to carry out image output processing, on at least one of image data temporarily stored in said storing means and image data which is read from said storing means after the supplementary information has been added thereto and the image data has been temporarily stored in said storing means; and transfer means for transferring to the output device, as image data for output, the image data which, after having been temporarily stored in said storing means, was read and for which image processing by said image processing means has been completed.

2. An image processing system according to claim 1, wherein in a case in which supplementary information is added to the image data, on the basis of the supplementary information added to the image data, said image processing means carries out image processing which corresponds to the attributes of the image data and to the output device which is to carry out image output processing.

3. An image processing system according to claim 1, wherein in a case in which said image processing means carries out a predetermined image processing on the image data, said adding means adds, to the supplementary information of the image data, information expressing that the predetermined image processing has been carried out by said image processing means.

4. An image processing system according to claim 1, wherein image data, which has been inputted from a first input device which is to operate at a high speed or a high operation rate, has supplementary information added thereto and is temporarily stored in said storing means, and thereafter, said image processing means reads the image data from said storing means and carries out image processing.

5. An image processing system according to claim 1, wherein before image data, for which a first output device, which is to operate at high speed or a high operation rate, is set as an output device for carrying out image output processing, is temporarily stored in said storing means, said image processing means carries out image processing.

6. An image processing system according to claim 1, wherein before image data, which is inputted from a second input device, of which high-speed or high-operation-rate operation is not required, is temporarily stored in said storing means, said image processing means carries out image processing.

7. An image processing system according to claim 1, wherein image data, for which a second output device, of which high-speed or high-operation-rate processing is not required, is set as an output device for carrying out image output processing, has supplementary information added thereto and is temporarily stored in said storing means, and thereafter, said image processing means reads the image data from said storing means, and carries out image processing, and has the image data transferred by said transfer means.

8. An image processing system according to claim 1, wherein in a case in which supplementary information is not added to the image data, on the basis of supplementary information including information relating to attributes of the image data, said image processing means carries out image processing which corresponds to the attributes of the image data and to the output device which is to carry out image output processing.

9. An image processing system according to claim 3, wherein in a case in which it is determined, on the basis of the supplementary information, that there are plural image processings to be carried out, said image processing means carries out the plural image processings at different times.

10. An image processing system according to claim 3, wherein in a case in which it is determined, on the basis of the supplementary information, that there are plural image processings to be carried out, each of said image processing means carries out at least one image processing simultaneously.

11. An image processing method for an image processing system including at least one input device which inputs image data and at least one output device which, on the basis of transferred image data for output, carries out image output processing, said image processing method comprising the steps of:

adding, to image data inputted from an input device, supplementary information including information relating to attributes of the image data;

carrying out image processing, which corresponds to the attributes of the image data or to an output device which is set as an output device which is to carry out image output processing, on at least one of image data, which is temporarily stored in a storing means for temporarily storing image data, and image data, which, after having had supplementary information added thereto and having been temporarily stored in the storing means, is read from the storing means; and transferring to the output device, as image data for output, image data which, after having been temporarily stored in the storing means, has been read and for which image processing has been completed.

12. An image processing method according to claim 11, wherein in a case in which supplementary information is added to the image data, on the basis of the supplementary information added to the image data, image processing which corresponds to the attributes of the image data and to the output device which is to carry out image output processing is carried out.

13. An image processing method according to claim 11, wherein in a case in which a predetermined image processing is carried out on the image data, information expressing that the predetermined image processing has been carried out is added to the supplementary information of the image data.

14. An image processing method according to claim 11, wherein image data, which has been inputted from a first input device which is to operate at a high speed or a high operation rate, has supplementary information added thereto and is temporarily stored in said storing means, and thereafter, the image data is read from said storing means and image processing is carried out.

15. An image processing method according to claim 11, wherein image processing is carried out before image data, for which a first output device, which is to operate at high speed or a high operation rate, is set as an output device for carrying out image output processing, is temporarily stored in said storing means.

16. An image processing method according to claim 11, wherein image processing is carried out before image data, which is inputted from a second input device, of which high-speed or high-operation-rate operation is not required, is temporarily stored in said storing means.

17. An image processing method according to claim 11, wherein image data, for which a second output device, of which high-speed or high-operation-rate processing is not required, is set as an output device for carrying out image output processing, has supplementary information added thereto and is temporarily stored in said storing means, and thereafter, the image data is read from said storing means, and image processing is carried out, and the image data is transferred by said transfer means.

* * * * *